United States Patent
Ma et al.

(10) Patent No.: US 11,902,021 B2
(45) Date of Patent: Feb. 13, 2024

(54) CHANNEL CODING METHOD, DATA RECEIVING METHOD, AND RELATED DEVICE

(71) Applicant: Huawei Technologies Co., Ltd., Shenzhen (CN)

(72) Inventors: Ruixiang Ma, Beijing (CN); Yongxia Lyu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 245 days.

(21) Appl. No.: 17/468,486

(22) Filed: Sep. 7, 2021

(65) Prior Publication Data
US 2022/0069943 A1 Mar. 3, 2022

Related U.S. Application Data

(63) Continuation of application No. 16/717,809, filed on Dec. 17, 2019, now Pat. No. 11,133,895, which is a
(Continued)

(30) Foreign Application Priority Data

Jun. 23, 2017 (CN) .......................... 201710492273.6

(51) Int. Cl.
*H04L 1/00* (2006.01)
*H04W 72/0446* (2023.01)
(52) U.S. Cl.
CPC .......... *H04L 1/0061* (2013.01); *H04L 1/0009* (2013.01); *H04L 1/0057* (2013.01); *H04W 72/0446* (2013.01)
(58) Field of Classification Search
CPC .................... H04L 1/00; H04L 1/0009; H04L 1/001–0019; H04L 1/0056–0059;
(Continued)

(56) References Cited

U.S. PATENT DOCUMENTS

| 8,189,559 B2 * | 5/2012 | Pi .......................... H04L 1/1874 |
| | | 714/752 |
| 8,379,756 B2 | 2/2013 | Kim et al. |

(Continued)

FOREIGN PATENT DOCUMENTS

| CN | 101039164 A | 9/2007 |
| CN | 101174937 A | 5/2008 |

(Continued)

OTHER PUBLICATIONS

"3rd Generation Partnership Project; Technical Specification Group Radio Access Network; NR; Multiplexing and channel coding (Release 15)," 3GPP TS 38.212 V0.0.0, 10 pages.
(Continued)

*Primary Examiner* — Chi H Pham
*Assistant Examiner* — Vladislav Y Agureyev
(74) *Attorney, Agent, or Firm* — Slater Matsil, LLP

(57) ABSTRACT

A method may include: dividing, by a sending device into k code blocks CBs, a TB into which a cyclic redundancy check bit is loaded, then separately performing channel coding on the k CBs, to obtain a bit sequence $S_j$, where j=1, 2, ..., and k, and a set $S=\{S_1, S_2, ..., S_k\}$, and mapping, by the sending device, some or all bit sequences in all elements in S to transmission resources in N basic transmission time units, where some or all bit sequences in the $S_j$ are mapped to transmission resources in $M_j$ basic transmission time units, and a last bit in the $S_j$ mapped to an $m^{th}$ basic transmission time unit in the $M_j$ basic transmission time units and a first bit in the $S_j$ mapped to an $(m+1)^{th}$ basic transmission time unit are contiguous in the $S_j$.

18 Claims, 6 Drawing Sheets

Related U.S. Application Data continuation of application No. PCT/CN2018/092013, filed on Jun. 20, 2018.

(58) Field of Classification Search
CPC . H04L 1/006–0069; H04L 5/00–0098; H04W 28/02–0294; H04W 72/04–0493
See application file for complete search history.

(56) References Cited

U.S. PATENT DOCUMENTS

| | | |
|---|---|---|
| 8,555,148 B2 | 10/2013 | Pi et al. |
| 9,973,917 B2 | 5/2018 | Wang et al. |
| 2009/0119568 A1 | 5/2009 | Shen et al. |
| 2009/0285193 A1 | 11/2009 | Kim et al. |
| 2011/0013615 A1 | 1/2011 | Lee et al. |
| 2011/0214032 A2 | 9/2011 | Furusawa et al. |
| 2012/0113831 A1 | 5/2012 | Pelletier et al. |
| 2012/0327885 A1 | 12/2012 | Chung et al. |
| 2013/0128843 A1 | 5/2013 | Cheon et al. |
| 2014/0036850 A1 | 2/2014 | Akimoto et al. |
| 2014/0040694 A1 | 2/2014 | Verma et al. |
| 2014/0185712 A1 | 6/2014 | Dong et al. |
| 2014/0362832 A1 | 12/2014 | Rudolf et al. |
| 2014/0369290 A1 | 12/2014 | Yang et al. |
| 2015/0092671 A1 | 4/2015 | Fiallos et al. |
| 2016/0006548 A1 | 1/2016 | Yang et al. |
| 2016/0028513 A1 | 1/2016 | Werner et al. |
| 2016/0196825 A1 | 7/2016 | Chen et al. |
| 2016/0323854 A1* | 11/2016 | Gao .......................... H04L 5/14 |
| 2017/0171850 A1 | 6/2017 | Ang et al. |
| 2017/0185712 A1 | 6/2017 | Karten |
| 2017/0294990 A1 | 10/2017 | Xu et al. |
| 2017/0303248 A1* | 10/2017 | Chatterjee ............. H04W 72/23 |
| 2018/0042040 A1 | 2/2018 | Chen et al. |
| 2018/0070369 A1 | 3/2018 | Papasakelliariou |
| 2018/0167931 A1 | 6/2018 | Papasakellariou |
| 2018/0278370 A1* | 9/2018 | Jeong ................... H04L 1/0058 |
| 2019/0074937 A1 | 3/2019 | Bhattad et al. |
| 2019/0149365 A1 | 5/2019 | Chatterjee et al. |
| 2019/0150148 A1 | 5/2019 | Ouchi et al. |
| 2019/0229751 A1 | 7/2019 | Kim et al. |
| 2019/0327024 A1 | 10/2019 | Lee et al. |
| 2019/0379487 A1 | 12/2019 | Hwang et al. |
| 2020/0092047 A1 | 3/2020 | Yeo et al. |
| 2020/0136783 A1 | 4/2020 | Takeda et al. |
| 2020/0145142 A1* | 5/2020 | Yoshimura ............ H04L 1/0061 |
| 2020/0169351 A1* | 5/2020 | Yoshimura ............ H04L 5/0055 |
| 2020/0186306 A1* | 6/2020 | Sun .......................... H04L 1/08 |
| 2020/0212937 A1* | 7/2020 | Li ....................... H03M 13/2707 |
| 2020/0266944 A1 | 8/2020 | Kakishima et al. |
| 2020/0403640 A1* | 12/2020 | Jeon .................. H03M 13/6306 |
| 2021/0099250 A1* | 4/2021 | Yamada .................... H04L 1/00 |
| 2021/0120537 A1* | 4/2021 | Lei ......................... H04L 1/1893 |

FOREIGN PATENT DOCUMENTS

| | | | |
|---|---|---|---|
| CN | 101282192 A | 10/2008 | |
| CN | 101330671 A | 12/2008 | |
| CN | 102739378 A | 10/2012 | |
| CN | 104254995 A | 12/2014 | |
| CN | 104854813 A | 8/2015 | |
| CN | 105264803 A | 1/2016 | |
| CN | 105308886 A | 2/2016 | |
| EP | 2932642 B1 | 6/2016 | |
| EP | 3540998 B1 * | 11/2021 | ........ H03M 13/1102 |
| WO | 2013139259 A1 | 9/2013 | |
| WO | WO-2018074071 A1 * | 4/2018 | ............ H03M 13/27 |

OTHER PUBLICATIONS

ZTE, et al.,"Clarification on channel coding for UCI HARQ-ACK"; 3GPP TSG-RAN Meeting #55bis R1-090444; Jan. 12-16, 2009; 10 pages, Ljubljana, Slovenia.

Nokia et al., "Transport block size determination and the support of slot aggregation in NR", 3GPP Draft; R1-1710991,Jun. 17, 2017 (Jun. 17, 2017), XP051305289, 4 pages.

\* cited by examiner

CHANNEL CODING METHOD, DATA RECEIVING METHOD, AND RELATED DEVICE

CROSS-REFERENCE TO RELATED APPLICATIONS

This application is a continuation of U.S. patent application Ser. No. 16/717,809, filed on Dec. 17, 2019, which is a continuation of International Application No. PCT/CN2018/092013, filed on Jun. 20, 2018. The International Application claims priority to Chinese Patent Application No. 201710492273.6, filed on Jun. 23, 2017. All of the aforementioned patent applications are hereby incorporated by reference in their entireties.

TECHNICAL FIELD

The present invention relates to the field of communications technologies, and in particular, to a channel coding method, a data receiving method, and a related device.

BACKGROUND

Currently, in a slot bundling (e.g., Transmission Time Interval (TTI) Bundling) technology, a data packet is repeatedly transmitted on a plurality of consecutive TTI resources, and a receive end combines data on the plurality of TTI resources, to improve transmission quality.

A basic unit of physical-layer scheduling in long term evolution (LTE) is 1 ms. A time delay required in LTE may be relatively small due to such a small time interval. However, if coverage is limited on some cell edges, UE may fail to meet a block error rate (BLER) requirement for data sending within the time interval of 1 ms due to limited transmit power of the UE. Therefore, a concept of TTI bundling is proposed in LTE. Uplink consecutive TIIs are bundled, and are allocated to same user equipment (UE). In this way, a probability of successful data decoding can be improved, and an uplink coverage area in LTE can be increased.

FIG. 1 is a schematic structural diagram of a transport block (TB) according to an embodiment of the present invention. In FIG. 1, uplink subframes 0, 1, 2, and 3 are bundled together and are transmitted in a hybrid automatic repeat request (HARQ) process 0. Different redundancy versions (RV), that is, an RV 0, an RV 1, an RV 2, and an RV 3, of a same transport block TB are respectively sent in the subframes 0 to 3. The different redundancy versions, that is, the RV 0, the RV 1, the RV 2, and the RV 3, of the same transport block are used in the current system. Consequently, data transmitted a plurality of times is not always continuously read from a bit sequence obtained after channel coding. In some communication application scenarios, the data transmitted the plurality of times is discontinuous for some coding schemes. Consequently, decoding performance may be unstable, and overall system performance is unstable. In different transmission cases, an urgent to-be-resolved problem is how to select a coded bit from the bit sequence obtained after the channel coding for data sending, to implement optimal system performance.

SUMMARY

A technical problem to be resolved in embodiments of the present invention is to provide a channel coding method, a data receiving method, and a related device, to ensure channel decoding stability when basic transmission time units are aggregated for scheduling.

According to a first aspect, an embodiment of the present invention provides a channel coding method. The method may include: loading, by a sending device, a cyclic redundancy check bit into a transport block TB; dividing, by the sending device into k code blocks CBs, the TB into which the cyclic redundancy check bit is loaded, where k is an integer greater than or equal to 1; separately performing, by the sending device, channel coding on the k CBs, to obtain a bit sequence $S_j$ obtained after the channel coding, where j=1, 2, . . . , and k, and a set $S=\{S_1, S_2, \ldots, S_k\}$; and mapping, by the sending device, some or all bit sequences in all elements in S to transmission resources in N basic transmission time units, where N is an integer greater than 1; some or all bit sequences in the $S_j$ are mapped to transmission resources in $M_j$ basic transmission time units; the $M_j$ basic transmission time units are a subset or a universal set of the N basic transmission time units, j=1, 2, . . . , and k, and $M_j$ is an integer greater than 1 and less than or equal to N; and a last bit in the $S_j$ mapped to an $m^{th}$ basic transmission time unit in the $M_j$ basic transmission time units and a first bit in the $S_j$ mapped to an (m+1)th basic transmission time unit are contiguous in the $S_j$, m is an integer greater than or equal to 1, and m+1 is less than or equal to $M_j$.

Optionally, the mapping, by the sending device, some or all bit sequences in all elements in S to transmission resources in N basic transmission time units includes: cross-mapping, by the sending device, some or all the bit sequences in all the elements in S to the transmission resources in the N basic transmission time units, where the cross mapping is that some or all bit sequences in different Sjs are cross-mapped to transmission resources in a plurality of basic transmission time units; or sequentially mapping, by the sending device, some or all the bit sequences in all the elements in S to the transmission resources in the N basic transmission time units, where the sequential mapping is that some or all bit sequences in a same $S_j$ are continuously mapped to transmission resources in a plurality of basic transmission time units.

Optionally, the method further includes: sending, by the sending device, first indication information to the receiving device, where the first indication information is used to indicate a mapping manner in which the sending device maps some or all the bit sequences in all the elements in S to the transmission resources in the N basic transmission time units, and the mapping manner includes the cross mapping and the sequential mapping.

Optionally, the basic transmission time unit includes any one of a subframe, a slot, and a mini-slot.

Optionally, $S_j$ is a bit sequence obtained after low-density parity-check (LDPC) coding, where j=1, 2, . . . , and k.

Optionally, the method further includes: when determining that the receiving device fails to receive the TB into which the cyclic redundancy check bit is loaded, obtaining, by the sending device, a bit sequence starting from a specific location in the $S_j$, and mapping the bit sequence to the transmission resources in the $M_j$ basic transmission time units, where the specific location is preset by the sending device or the receiving device, and j=1, 2, . . . , and k.

According to a second aspect, an embodiment of the present invention provides a data receiving method. The method may include: receiving, by a receiving device, target data sent by a sending device, where the target data is sent by the sending device by mapping some or all bit sequences in all elements in a set $S=\{S_1, S_2, \ldots, S_k\}$ to transmission resources in N basic transmission time units; the element in S is a bit sequence $S_j$ obtained after channel coding is separately performed on k code blocks CBs obtained from a transport block TB into which a cyclic redundancy check bit is loaded, j=1, 2, ..., and k, k is an integer greater than or equal to 1, and N is an integer greater than 1; some or all bit sequences in the $S_j$ are mapped to transmission resources in $M_j$ basic transmission time units; the $M_j$ basic transmission time units are a subset or a universal set of the N basic transmission time units, j=1, 2, ..., and k, and $M_j$ is an integer greater than 1 and less than or equal to N; and a last bit in the $S_j$ mapped to an $m^{th}$ basic transmission time unit in the $M_j$ basic transmission time units and a first bit in the $S_j$ mapped to an $(m+1)^{th}$ basic transmission time unit are contiguous in the $S_j$, m is an integer greater than or equal to 1, and m+1 is less than or equal to $M_j$.

Optionally, the target data is sent by the sending device by cross-mapping some or all the bit sequences in all the elements in S to the transmission resources in the N basic transmission time units, and the sequential mapping is that some or all bit sequences in different Sjs are cross-mapped to transmission resources in a plurality of basic transmission time units; or the target data is sent by the sending device by sequentially mapping some or all the bit sequences in all the elements in S to the transmission resources in the N basic transmission time units, and the sequential mapping is that some or all bit sequences in a same $S_j$ are continuously mapped to transmission resources in a plurality of basic transmission time units.

Optionally, the method further includes: receiving, by the receiving device, first indication information sent by the sending device, where the first indication information is used to indicate a mapping manner in which the sending device maps some or all the bit sequences in all the elements in S to the transmission resources in the N basic transmission time units, the mapping manner includes the cross mapping and the sequential mapping, the cross mapping is that some or all bit sequences in different Sjs are cross-mapped to transmission resources in a plurality of basic transmission time units, and the sequential mapping is that some or all bit sequences in a same $S_j$ are continuously mapped to transmission resources in a plurality of basic transmission time units.

According to a third aspect, this application provides a sending device, and the sending device has a function of implementing the method in any embodiment of the channel coding method. The function may be implemented by hardware, or may be implemented by hardware executing corresponding software. The hardware or the software includes one or more modules corresponding to the foregoing function.

According to a fourth aspect, this application provides a receiving device, and the receiving device has a function of implementing the method in any embodiment of the data receiving method. The function may be implemented by hardware, or may be implemented by hardware executing corresponding software. The hardware or the software includes one or more modules corresponding to the foregoing function.

According to a fifth aspect, this application provides a sending device, and the network device includes a processor. The processor is configured to support the network device in performing a corresponding function in the channel coding method provided in the first aspect. The network device may further include a memory. The memory is configured to: be coupled to the processor, and store a program instruction and data that are necessary for the network device. The network device may further include a communications interface, configured to perform communication between the network device and another device or a communications network.

According to a sixth aspect, this application provides a receiving device, and the terminal device includes a processor. The processor is configured to support the terminal device in performing a corresponding function in the data receiving method provided in the second aspect. The terminal device may further include a memory. The memory is configured to: be coupled to the processor, and store a program instruction and data that are necessary for the terminal device. The terminal device may further include a communications interface, configured to perform communication between the terminal device and another device or a communications network.

According to a seventh aspect, this application provides a computer storage medium, configured to store a computer software instruction used by the sending device provided in the fifth aspect. The computer software instruction includes a program designed for performing the foregoing aspects.

According to an eighth aspect, this application provides a computer storage medium, configured to store a computer software instruction used by the receiving device provided in the sixth aspect. The computer software instruction includes a program designed for performing the foregoing aspects.

According to a ninth aspect, an embodiment of the present invention provides a computer program. The computer program includes an instruction. When the computer program is executed by a computer, the computer may be enabled to perform a procedure in the channel coding method in any one of items of the first aspect.

According to a tenth aspect, an embodiment of the present invention provides a computer program. The computer program includes an instruction. When the computer program is executed by a computer, the computer may be enabled to perform a procedure in the data receiving method in any one of items of the second aspect.

BRIEF DESCRIPTION OF THE DRAWINGS

The following describes the accompanying drawings required for the embodiments or the background of the present invention.

DETAILED DESCRIPTION OF ILLUSTRATIVE EMBODIMENTS

The following describes the embodiments of the present invention with reference to the accompanying drawings in the embodiments of the present invention.

Figure 2:
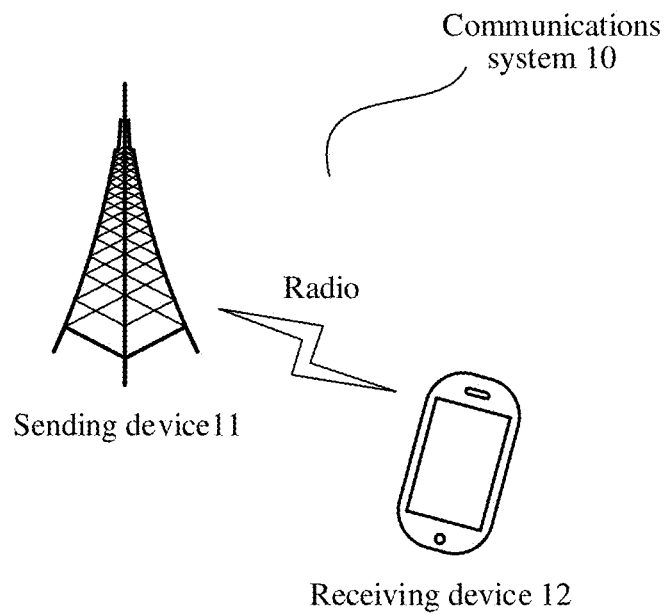
FIG. 2 is a diagram of an architecture of a communications system in this application.

FIG. 2 is a diagram of an architecture of a communications system according to an embodiment of the present invention. The communications system 10 includes a sending device 11 and a receiving device 12. The sending device and the receiving device communicate with each other by using a wireless air interface technology. The sending device and the receiving device in each embodiment of the present invention may be respectively any device at a transmit end and any device at a receive end that perform data transmission in a wireless manner. For example, when the sending device is the device at the transmit end, a corresponding receiving device is the device at the receive end. The sending device and the receiving device each may be any device with a wireless transceiver function, and include but are not limited to a NodeB, an evolved NodeB (eNodeB), a gNB in a 5th generation (5G) communications system, a base station or a network device in a future communications system, an access node in a wireless local area network (Wi-Fi) system, a wireless relay node, a wireless backhaul node, and user equipment (UE). The UE may also be referred to as a terminal, a mobile station (MS), a mobile terminal (MT), or the like. The UE may be a station (ST) in a wireless local area network (WLAN), such as a cellular phone, a cordless telephone set, a session initiation protocol (SIP) phone, a wireless local loop (WLL) station, a personal digital processing (PDA) device, a handheld device with a wireless communication function, a computing device, or another processing device connected to a wireless modem, a vehicle-mounted device, a wearable device, a terminal device in a next generation communications system such as a 5th generation (5G) communications network, a terminal device in a future evolved public land mobile network (PLMN) network, or the like. The UE may communicate with one or more core networks through a radio access network (RAN), or may access a distributed network in a self-organizing or grant-free manner. Alternatively, the UE may access a wireless network in another manner for communication, or the UE may directly perform wireless communication with another UE. This is not limited in this embodiment of the present invention.

A channel coding method provided in the embodiments of the present invention may be applied to downlink data transmission, or may be applied to uplink data transmission, or may be applied to device-to-device (D2D) data transmission. For the downlink data transmission, a sending device is a base station, and a corresponding receiving device is UE. For the uplink data transmission, a sending device is UE, and a corresponding receiving device is a base station. For the D2D data transmission, a sending device is UE, and a corresponding receiving device is also UE. An application scenario is not limited in the embodiments of the present invention. For example, in FIG. 2, the sending device is a base station, and the receiving device is UE.

The channel coding method provided in the embodiments of the present invention may be applied to a communications system using a HARQ technology, may be applied to a frequency division duplex (FDD) system, or may be applied to a time division duplex (TDD) system. Alternatively, the channel coding method provided in the embodiments of the present invention may be applied to any communications system in which a low-density parity-check (e.g., Quasi-Cyclic Low Density Parity Check (QC-LDPC)) code is used as a data channel coding scheme, may be applied to an LTE system, or may be applied to a 5G radio access (e.g., New Radio Access Technology in 3GPP (NR)) system and another wireless communications system. This is not limited in the embodiments of the present invention.

Figure 1:
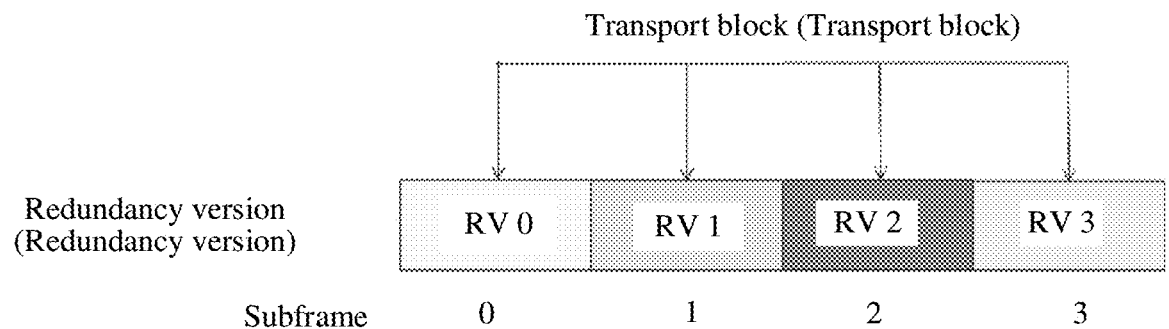
FIG. 1 is a schematic structural diagram of a transport block TB according to an embodiment of the present invention.

It may be understood that the architecture of the communications system in FIG. 1 is merely an example implementation in the embodiments of the present invention, and an architecture of a communications system in the embodiments of the present invention includes but is not limited to the foregoing architecture of the communications system.

A technical problem that needs to be resolved in this application and an application scenario are described below.

Figure 3:
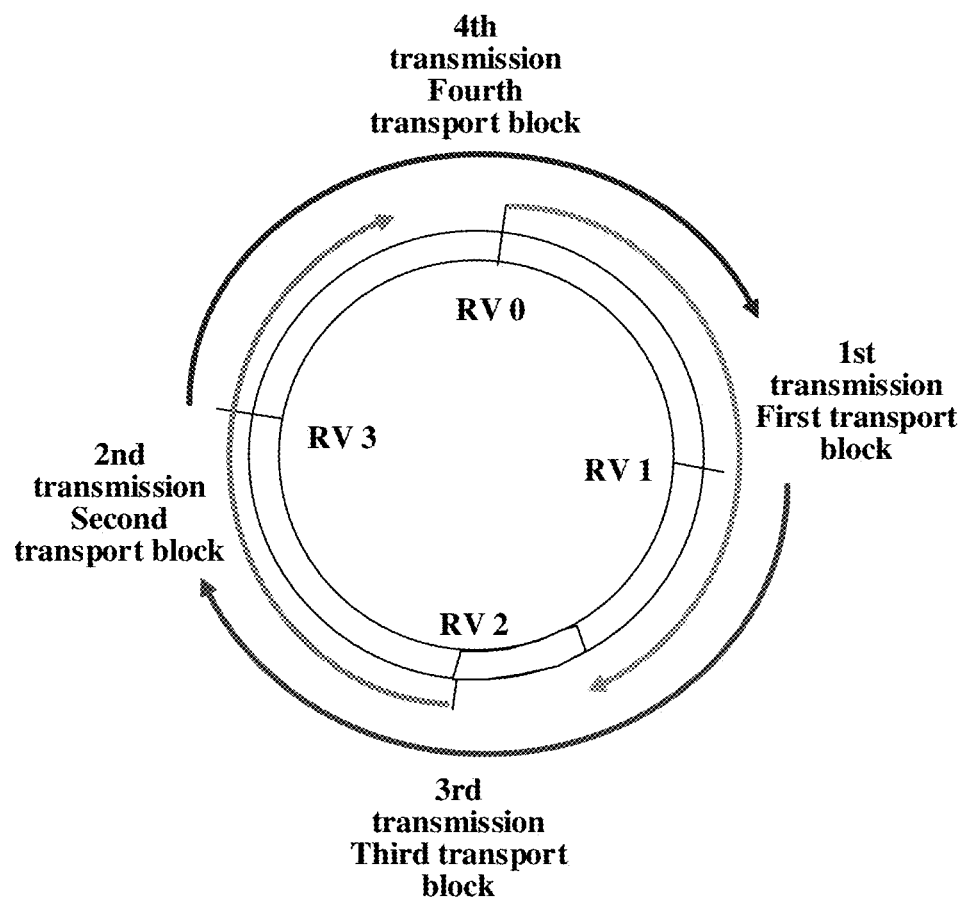
FIG. 3 is a schematic diagram of turbo coding according to an embodiment of the present invention.

In an existing LTE system, a turbo code whose mother code rate is 1/3 is used as a basic channel coding scheme, namely, an error-correcting code on a data channel. A coded complete bit sequence forms a virtual ring, and four fixed equal points are selected from the ring as start points for initially transmitting or retransmitting data. FIG. 3 is a schematic diagram of a turbo code according to an embodiment of the present invention. A sending device determines a location of each RV based on a length of an actual to-be-transmitted source bit sequence, a length of a redundancy check bit sequence, and an RV number. The location of the RV is a start location of a bit sequence of the RV in the coded complete bit sequence. Different redundancy versions, that is, an RV 0, an RV 1, an RV 2, and an RV 3, of a same CB are respectively sent in subframes 0 to 3. Because the different redundancy versions are used for the same CB, data transmitted a plurality of times is not always continuously read from a cache. To be specific, the RV 0, the RV 1, the RV 2 and the RV 3 are all fixed start locations, and it is likely that the start locations are discontiguous.

However, in a 5th generation new radio (5G NR) system, a low-density parity-check (LDPC) coding method is introduced and is used as an error-correcting code on a data channel for channel coding. Coded bits are continuously selected, so that LDPC decoding performance can be more stable and performance can be optimal. However, in a current LTE system, a plurality of inconsecutive redundancy versions are used during aggregation and transmission in a plurality of basic transmission time units. Therefore, the technical problem to be resolved in this application is how to select, from a bit sequence obtained after channel coding, a bit obtained after LDPC coding for sending, to implement optimal data performance.

With reference to embodiments of a channel coding method and a data receiving method that are provided in this application, the following specifically analyzes and resolves the technical problem described in this application.

Figure 4:
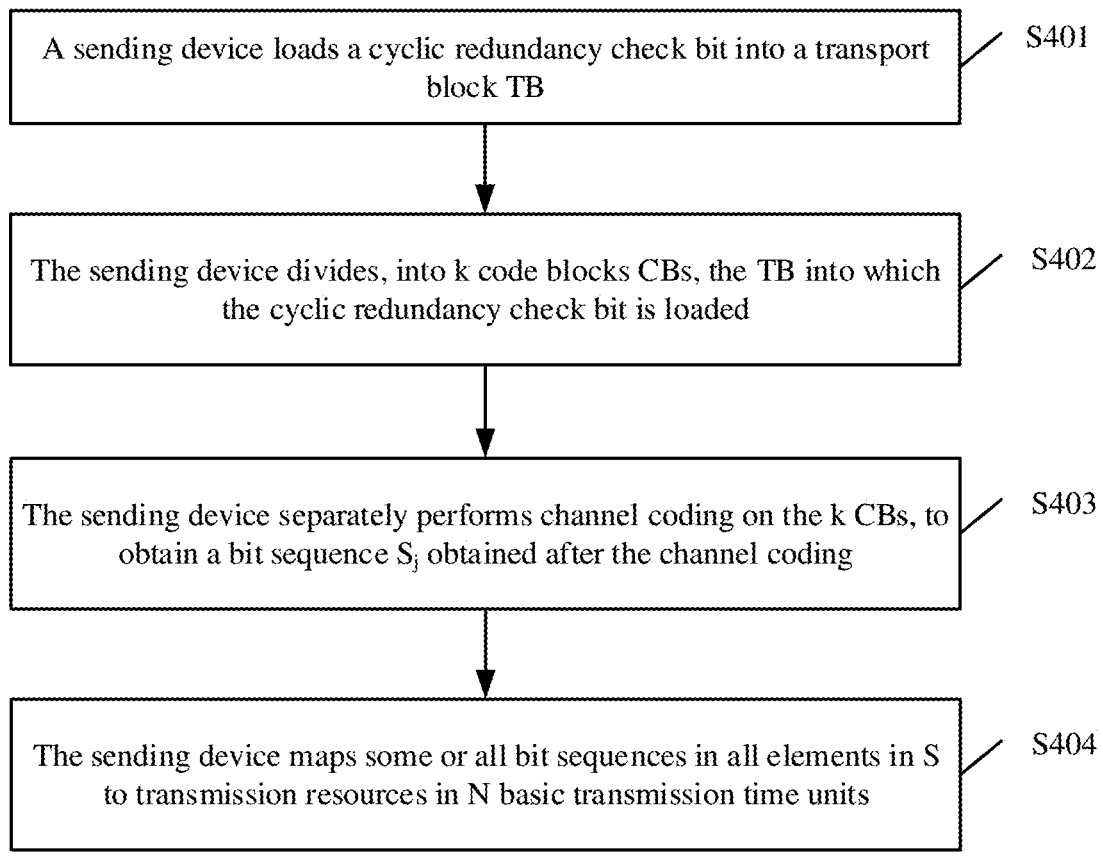
FIG. 4 is a schematic flowchart of a channel coding method according to an embodiment of the present invention.

FIG. 4 is a schematic flowchart of a channel coding method according to an embodiment of the present invention. The method may be applied to the communications system in FIG. 2. Descriptions are provided below from a perspective of a sending device with reference to FIG. 4. The method may include step S401 to step S403.

Step S401: The sending device loads a cyclic redundancy check bit into a transport block TB.

Specifically, in an actual communications link, an error may occur in a bit transmission process, and a bit 0 changes to a bit 1, or a bit 1 changes to a bit 0. Therefore, to ensure data transmission reliability, during data transmission, various check measures need to be used to process a bit error. A cyclic redundancy check (CRC) technology is widely used at a data link layer. A CRC check principle is actually to add an r-bit binary check code (e.g., sequence) after a p-bit binary data sequence, to form a binary sequence with a total length of n=p+r bits. There is a specific relationship between the check code added after the data sequence and content of the data sequence. This specific relationship is damaged if an error occurs on a bit or some bits in the data sequence due to interference or the like. Therefore, data correctness can be checked by checking this relationship.

Step S402: The sending device divides, into k code blocks CBs, the TB into which the cyclic redundancy check bit is loaded, where k is an integer greater than or equal to 1.

Specifically, the transmit end performs code block segmentation after adding the CRC check bit to the TB, and divides the TB into the code blocks (CB). The transmit end performs CRC coding on each CB, and sends the CB to a channel encoder for channel coding after adding a CRC check bit to the CB. In this case, if k=1, it indicates that CB segmentation does not need to be performed, in other words, CRC needs to be performed only once; or when k is greater than 1, it indicates that the TB is divided into a plurality of CBs, and the CRC check bit needs to be separately loaded into the CBs obtained through division.

Step S401: The sending device separately performs channel coding on the k CBs, to obtain a bit sequence $S_j$ obtained after the channel coding, where j=1, 2, . . . , and k, and a set S={$S_1, S_2, \ldots, S_k$}.

Specifically, the CBs into which the CRC check bit is separately loaded are separately sent to the channel encoder for channel coding, to obtain the bit sequence $S_j$ obtained after the channel coding, where j=1, 2, . . . , and k. To be specific, $CB_1, CB_2, \ldots,$ and $CB_k$ respectively correspond to bit sequences $S_1, S_2, \ldots,$ and $S_k$ obtained after the channel coding, and the set S={$S_1, S_2, \ldots, S_k$}. When k is equal to 1, to be specific, when the TB into which the cyclic redundancy check bit is loaded includes only one CB, in other words, when the TB is not divided, the CRC bit does not need to be reloaded into the CB, and channel coding is directly performed. When k is greater than 1, to be specific, when the TB into which the cyclic redundancy check bit is loaded needs to be divided into a plurality of CBs, in a process of performing channel coding on the plurality of CBs, the CRC bit needs to be first loaded into each CB obtained through division, and then channel coding is performed.

Step S403: The sending device maps some or all bit sequences in all elements in S to transmission resources in N basic transmission time units.

Specifically, rate matching and code stream combination need to be performed on coded data streams $S_1, S_2, \ldots,$ and $S_k$, and a bit rate bit sequence obtained after adjustment and control is generated. In this case, some or all bit sequences in $S_1, S_2, \ldots,$ and $S_k$ may be mapped based on different code rates. For example, when a code rate is less than or equal to a mother code rate (for example, the mother code rate is 1/3 or 1/5), all the bit sequences in all the elements in the set S may be transmitted, and transmission may be repeated a plurality of times. When a code rate is greater than a mother code rate (for example, the mother code rate is 1/3 or 1/5), only some bit sequences in all the elements in the set S can be transmitted.

N is an integer greater than 1. To be specific, it indicates that some or all the bit sequences in $S_1, S_2, \ldots,$ and $S_k$ are initially transmitted or retransmitted in a plurality of time units.

For each $S_j$, some or all bit sequences in the $S_j$ are mapped to transmission resources in $M_j$ basic transmission time units. The $M_j$ basic transmission time units are a subset or a universal set of the N basic transmission time units, where j=1, 2, . . . , and k, and $M_j$ is an integer greater than 1 and less than or equal to N. For example, some or all bit sequences in $S_2$ are mapped to $M_2$ basic transmission time units in the N basic transmission time units, and so on. Because there may be a plurality of transmission resources in a same basic transmission time unit, $M_j$ corresponding to different Sjs may be all identical or different, or may be partially the same or different. This is not specifically limited in this application.

Optionally, the basic transmission time unit includes any one of a subframe, a slot, and a mini-slot.

Optionally, the $S_j$ is a bit sequence obtained after low-density parity-check LDPC coding, where j=1, 2, . . . , and k. Cached data is continuously read in a plurality of basic transmission time units to improve stability of an LDPC code, so as to improve overall system performance.

Figure 5:
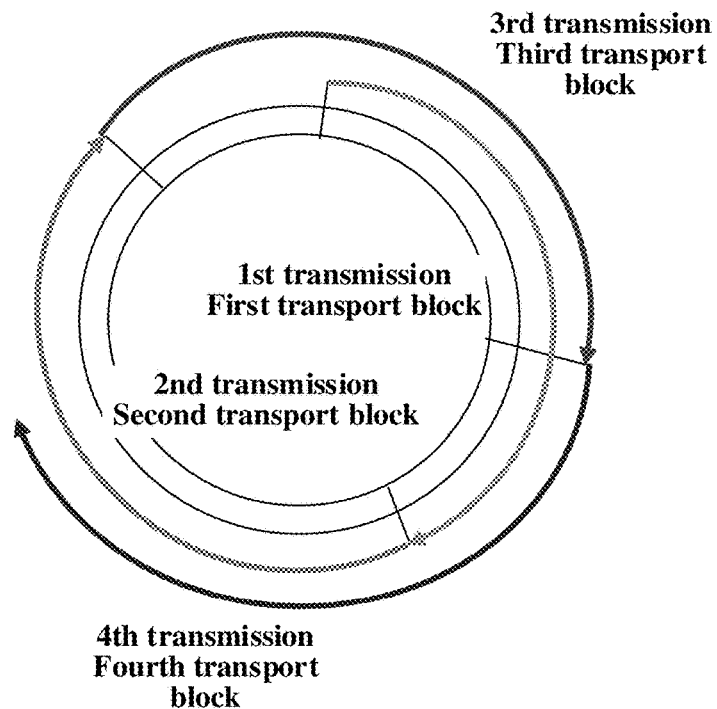
FIG. 5 is a schematic diagram of LDPC coding according to an embodiment of the present invention.

In this application, a last bit in the $S_j$ mapped to an $m^{th}$ basic transmission time unit in the $M_j$ basic transmission time units and a first bit in the $S_j$ mapped to an $(m+1)^{th}$ basic transmission time unit are contiguous in the $S_j$, where m is an integer greater than or equal to 1, and m+1 is less than or equal to $M_j$. To be specific, a tail bit of a bit sequence and a head bit of a bit sequence that are in a same $S_j$ and mapped to two adjacent different basic transmission time units in $M_1$ basic transmission time units are continuously read from the $S_j$. In other words, a same CB mapped to different consecutive basic transmission time units is continuously read from a cache. FIG. 5 is a schematic diagram of LDPC coding according to an embodiment of the present invention. In FIG. 5, four transmission versions of a CB are contiguous in a head-to-tail manner. For example, a tail of a first transmission version and a head of a second transmission version are contiguous in a coding sequence corresponding to the CB.

Optionally, finally, after performing modulation and power control processing on the bit sequences mapped to the transmission resources in step S404, the sending device generates a baseband processing signal, namely, a to-be-sent symbol, and sends the baseband processing signal to a receive end through a channel.

Based on a general idea of continuously reading the bit sequence from the cache in the foregoing embodiment of the present invention corresponding to FIG. 4, the following describes, in detail with reference to an example implementation, how the sending device may continuously read some or all the bit sequences in all the elements from S and map some or all the bit sequences to the transmission resources in the N basic transmission time units. First, based on different mapping phases of the sending device, there are three types of specific implementations, including that the sending device performs mapping in a rate matching phase, a CB concatenation phase, or a phase in which a modulation symbol is mapped to a time-frequency resource.

Type 1: That the sending device performs mapping in the rate matching phase may specifically include the following steps:

Step 1: The sending device adds CRC to a transport block TB A to generate a bit sequence B.

Step 2: The sending device divides the bit sequence B into at least one code block $CB_1, CB_2, \ldots,$ and $CB_k$, and separately loads the cyclic redundancy check (CRC) bit into the code blocks, to obtain a $CB'_1$, a $CB'_2, \ldots,$ and a $CB'_k$.

Step 3: The sending device separately performs LDPC channel coding on the code blocks $CB'_1, CB'_2, \ldots,$ and $CB'_k$ into which the cyclic redundancy check bit is separately loaded, to generate corresponding coded bit sequences $S_1, S_2, \ldots,$ and $S_k$.

Step 4: The sending device separately performs rate matching on the code blocks $S_i, S_2, \ldots,$ and $S_k$ obtained after the channel coding. The rate matching is performed by using $X \times \log_2 Y$ as a quantity of output bits, where Y is a quantity of constellation points in a modulation scheme (for example, a quantity Y of constellation points in quadrature phase shift keying (QPSK) is equal to 4, and a quantity Y of constellation points in 16 quadrature amplitude modulation (QAM) is equal to 16). The sending device reads bit sequences $E_1, E_2, \ldots,$ and $E_k$ from the bit sequences $S_1, S_2, \ldots,$ and $S_k$ according to a specific rate matching rule, for example, continuous reading or rule disturbing. $E_1$ corresponding to a same CB is transmitted a plurality of times, and may be mapped to a plurality of different basic transmission time units. Therefore, $E_{1-1}, E_{1-2}, \ldots,$ and $E_{1-Q}$ are used to separately indicate Q different transmission versions that are sequentially read from $E_1$ Q times. For another example, for $E_2$, $E_{2-1}, E_{2-2}, \ldots,$ and $E_{2-M2}$ may be used to indicate different transmission versions that are sequentially read from $E_2$ Q times, and so on. It may be understood that for different $E_1, E_2, \ldots,$ and $E_k$, Q may have a same value or different values. In addition, values of Q correspond to different subsequently-used mapping manners, and a value of Q may be greater than or equal to $M_j$. X has two types of specific meanings and values respectively corresponding to the following two manners in which mapping is performed in a rate matching phase:

Manner 1: $E_1, E_2, \ldots,$ and $E_k$ are cross-mapped.

In the manner 1, for a transport block in at least one basic transmission time unit (N basic transmission time units), values of X are respectively $X_1, X_2, \ldots,$ and $X_N$, and each indicate a quantity of transmission resources in a transport block in each corresponding basic transmission time unit. For example, if the value of X is $X_1$, X indicates a quantity of transmission resources in a first basic transmission time unit; if the value of X is $X_2$, X indicates a quantity of transmission resources in a second basic transmission time unit; ...; and if the value of X is $X_N$, X indicates a quantity of transmission resources in an $N^{th}$ basic transmission time unit.

For $X_1$, $X_1 \times \log_2 Y$ is used as a total quantity of bits that are read and mapped k times in the first basic transmission time unit in a cross mapping process. Specifically, a specific bit sequence read and mapped k times is a bit sequence $E_{j-1}$ respectively read according to a specific rate matching rule starting from an $(x_{1,j,E1-1-1})^{th}$ bit to an $(x_{1,j,E1-1-z})^{th}$ bit in the bit sequences $S_1, S_2, \ldots,$ and $S_k$, where j=1, 2, ..., and k. A first bit in a subscript of x represents a specific basic transmission time unit in the $M_j$ basic transmission time units, a second bit represents a specific CB in k CBs, and a third bit represents a specific bit in $E_{1-1}, E_{1-2}, \ldots,$ and $E_{1-Q}$ corresponding to a specific CB (for example, the $CB_1$). For example, $_{E1-1-1}$ represents a first bit in $E_{1-1}$, and $_{E1-1-z}$ represents a last bit in $E_{1-1}$. To be specific, $x_{1,j,E1-1-z}$ represents a location of a first bit in $E_{j-1}$ corresponding to a $j^{th}$ (j=1, 2, ..., and k) CB in the first basic transmission time unit, in the bit sequence $S_j$ obtained after the channel coding is performed on the $j^{th}$ (j=1, 2, ..., and k) CB. It may be understood that the third bit z in the subscript $_{E1-1-z}$ indicates a last bit of a corresponding transmission version of a corresponding CB, and so on. It may be further understood that in a cross mapping manner, $Q = M_j = N$, and $M_j$ (j=1, 2, ..., and k) indicates that some or all bit sequences obtained after channel coding is performed on each CB are mapped to each of the N basic transmission units.

$Num(E_{1-1}) + Num(E_{1-2}) + \ldots + Num(E_{k-1}) = X_1 \times \log_2 Y$. The read location $x_{1,j,E1-1-1}$ of a first transmission version that is of a first CB, that is mapped to the first basic time transmission unit, and that is in $S_i$ may be 1, namely, a first bit in $S_1$, or may be a specific location in {r0, r1, r2, r3} of R values agreed on in a protocol, namely, a specific location in $S_1$. This is not specifically limited in this application. R is a set of redundancy versions. The sending device (for example, a base station) independently determines a specific redundancy version, and indicates the redundancy version to a receiving device (for example, UE) by using downlink control signaling. An independent determining principle of the base station may be related to a quantity of retransmissions. For example, a first transmission, a second transmission, a third transmission, and a fourth transmission respectively correspond to {r0, r1, r2, r3} or {r0, r1, r2, r3}.

Figure 6:
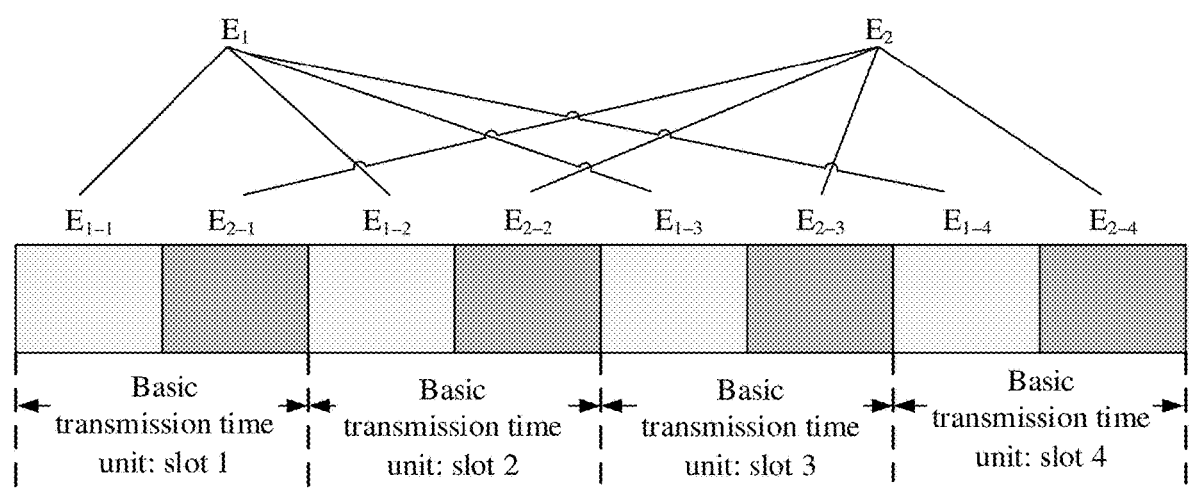
FIG. 6 is a schematic diagram of cross mapping according to an embodiment of the present invention.

For $X_2$, $X_2 \times \log_2 Y$ is used as a quantity of output bits, and a bit sequence $E_{j,2}$ is respectively read according to a specific rate matching rule starting from an $(x_{2,j,r})^{th}$ bit to an $(x_{2,j,z})^{th}$ bit in the bit sequences $S_1, S_2, \ldots,$ and $S_k$, where j=1, 2, ..., and k. $Num(E_{1-2}) + Num(E_{2-2}) + \ldots + Num(E_{k-2}) = X_2 \times \log_2 Y$, and $x_{2,j,1} = x_{1,j,z} + 1$. The same is true until $X_N$. FIG. 6 is a schematic diagram of cross mapping according to an embodiment of the present invention. In the figure, four (Q=4) different transmission versions $E_{1-1}, E_{1-2}, E_{1-3},$ and $E_{1-4}$ of $E_1$ and four (Q=4) different transmission versions $E_{2-1}, E_{2-2}, E_{2-3},$ and $E_{2-4}$ of $E_2$ each are cross-mapped to each of the N basic transmission time units. In addition, bit sequences of different transmission versions of a same CB are contiguous in two adjacent basic transmission time units. For example, a first bit in $E_{1-2}$ that is of the $CB_1$ and that is correspondingly mapped to a second basic transmission time unit and a last bit in $E_{1-1}$ that is of the $CB_1$ and that is correspondingly mapped to a first basic transmission time unit are contiguous in $S_1$.

Manner 2: $E_1, E_2, \ldots,$ and $E_k$ are sequentially mapped.

In the manner 2, for a transport block in at least one basic transmission time unit (e.g., N basic transmission time units), X represents a quantity of transmission resources that are in transport blocks in all (e.g., N) basic transmission time units and that are scheduled once. To be specific, $X = X_1 + X_2 + \ldots + X_N$, where $X_1, X_2, \ldots,$ and $X_N$ each represent a quantity of transmission resources in a transport block in each basic transmission time unit.

$X \times \log_2 Y$ is used as a quantity of output bits, and a bit sequence $E_j$ is respectively read according to a specific rate matching rule starting from an $(x_{j,1})^{th}$ bit to an $(x_{j,z})^{th}$ bit in the bit sequences $S_1, S_2, \ldots,$ and $S_k$, where j=1, 2, ..., and k. A first bit in a subscript of x represents a specific CB in k CBs, and a second bit in the subscript of x represents a specific bit read from the bit sequences $E_1, E_2, \ldots,$ and $Ex$ corresponding to a $CB_j$, where j=1, 2, ..., and k. For example, $x_1,1$ represents a location in $S_i$ at which a first bit in $E_1$ corresponding to the $CB_1$ is mapped to, and $x_{1,z}$ represents a location in $S_i$ at which a last bit in $E_1$ corresponding to the $CB_1$ is mapped to, and $x_{2,1}$ represents a location in $S_2$ at which a first bit in $E_2$ corresponding to the $CB_2$ is mapped to, and $x_{2,z}$ represents a location in $S_i$ at which a last bit in $E_2$ corresponding to the $CB_2$ is mapped to, and so on.

Num($E_1$)+ . . . +Num($E_k$)=X×$\log_2$Y. $x_{1,j,1}$ may be 1 or one of {r0, r1, r2, r3} of R values agreed on in a protocol. The sending device (for example, a base station) independently determines a specific redundancy version, and indicates the redundancy version to a receiving device (for example, UE) by using downlink control signaling. An independent determining principle of the base station may be related to a quantity of retransmissions. For example, a first transmission, a second transmission, a third transmission, and a fourth transmission respectively correspond to {r0, r1, r2, r3} or {r0, r1, r2, r3}.

Figure 7:
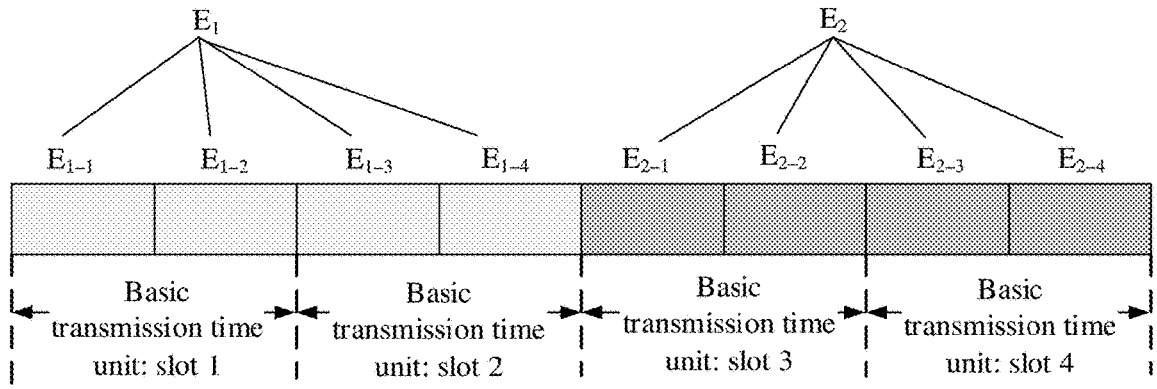
FIG. 7 is a schematic diagram of sequential mapping according to an embodiment of the present invention.

FIG. 7 is a schematic diagram of sequential mapping according to an embodiment of the present invention. In the figure, four (Q=4) different transmission versions $E_{1-1}$, $E_{1-2}$, $E_{1-3}$, and $E_{1-4}$ of $E_1$ corresponding to the $CB_1$ and four (Q=4) different transmission versions $E_{2-1}$, $E_{2-2}$, $E_{2-3}$, and $E_{2-4}$ of $E_2$ corresponding to the $CB_2$ each are sequentially mapped to different basic transmission time units. In other words, some or all bit sequences $E_j$ in a same $S_j$ are continuously mapped to transmission resources in a plurality of basic transmission time units.

Step 5: The sending device concatenates the code blocks. The following two specific methods are included, and respectively correspond to a manner 1 and a manner 2 in step 4.

Method 1: $E_1$, $E_2$, . . . , and $E_k$ are cross-mapped. Specifically, $E_{1-1}$, $E_{2-1}$, . . . , $E_{-k-1}$, $E_{1-2}$, $E_{2-2}$, . . . , $E_{k-2}$, . . . , $E_{1-N}$, $E_{2-N}$, . . . , and $E_{k-N}$ are sequentially concatenated, where k is a quantity of code blocks CBs, and N is a quantity of basic transmission time units. For example, $E_1$={1, 2, 3, 4, 5, 6, 7, 8}, $E_{1-1}$={1, 2}, $E_{1-2}$={3, 4}, $E_{1-3}$={5, 6}, and $E_{1-4}$={7, 8}. $E_2$, . . . , and $E_k$ are also divided by using a similar method.

Method 2: $E_1$, $E_2$, . . . , and $E_k$ are sequentially mapped. Specifically, the code blocks $E_1$, $E_2$, . . . , and $E_k$ are sequentially concatenated, where k is a quantity of code blocks.

Step 6: The sending device modulates the concatenated code blocks E, and sequentially maps the concatenated code blocks E to available resources.

In a specific implementation of the present invention, coding is implemented by performing cross mapping in the CB concatenation phase. To be specific, different transmission versions (for example, $E_{1-1}$, $E_{1-2}$, $E_{1-3}$, and $E_{1-4}$) of a same CB block are dispersedly mapped to the N basic transmission time units, to obtain a time diversity gain. In addition, predecoding can be implemented because one basic transmission time unit includes information about all CBs (k CBs). Corresponding to FIG. 6, decoding can be attempted after a basic transmission time unit, namely, a slot 1, and after a failure, a slot 2 continues to be received and decoding continues to be performed, and so on. If the predecoding succeeds, a feedback may be provided in advance, to avoid subsequent redundant transmission. A data block can be decoded after at least the slot 2 if coding is implemented by performing sequential mapping in the CB concatenation phase. To be specific, corresponding to FIG. 7, different transmission versions (for example, $E_{1-1}$, $E_{1-2}$, $E_{1-3}$, and $E_{1-4}$) of a same CB block are centrally and sequentially mapped to the $M_j$ basic transmission time units.

Type 2: That the sending device performs mapping in the CB concatenation phase may specifically include the following steps:

Steps 1 to 3 are the same as steps 1 to 3 in the first type of implementation.

Step 4: The sending device separately performs rate matching on the coded bit sequences $S_1$, $S_2$, . . . , and $S_k$. The rate matching is performed by using X×$\log_2$Y as a quantity of output bits, where X is a quantity of available transmission resources in each basic transmission time unit, and Y a quantity of constellation points in a modulation scheme (for example, a quantity M of constellation points in QPSK is equal to 4, and a quantity M of constellation points in 16 QAM is equal to 16). Bit sequences $E_1$, $E_2$, . . . , and $E_k$ are read from the bit sequences $S_1$, $S_2$, . . . , and $S_k$ according to a specific rate matching rule.

For a transport block in at least one basic transmission time unit, X represents a quantity of transmission resources that are in transport blocks in all the basic transmission time units and that are scheduled once. To be specific, N=$X_1$+$X_2$+ . . . +$X_N$, where $X_1$, $X_2$, . . . , and $X_N$ each represent a quantity of transmission resources in a transport block in each basic transmission time unit.

Step 5: The sending device concatenates the code blocks. There are two specific methods: Method 1 and Method 2.

Method 1: $E_1$, $E_2$, . . . , and $E_k$ are cross-mapped. Specifically, $E_{1-1}$, $E_{2-1}$, . . . , $E_{-k-1}$, $E_{1-2}$, $E_{2-2}$, . . . , $E_{k-2}$, . . . , $E_{1-N}$, $E_{2-N}$, . . . , and $E_{k-N}$ are sequentially connected, where k is a quantity of code blocks, and N is a quantity of basic transmission time units. $E_{1,1}$, $E_{1,2}$, . . . , and $E_{1,N}$ are continuously obtained from $E_1$ through division. A last bit in $E_{1,0}$ and a first bit in $E_{1,0+1}$ are contiguous in $E_1$. To be specific, a last bit in $E_1$ in an $O^{th}$ basic transmission time unit and a first bit in $E_1$ in an $(O+1)^{th}$ basic transmission time unit are contiguous in $E_1$.

For example, $E_1$={1, 2, 3, 4, 5, 6, 7, 8}, $E_{1-1}$={1, 2}, $E_{1-2}$={3, 4}, $E_{1-3}$={5, 6}, and $E_{1-4}$={7, 8}. $E_2$, . . . , and $E_k$ are also divided by using a similar method.

Optionally, a quantity of bits in each small block obtained through division is directly proportional to a quantity of available resources in each basic transmission time unit.

Method 2: $E_1$, $E_2$, . . . , and $E_k$ are sequentially mapped. Specifically, the code blocks $E_1$, $E_2$, . . . , and $E_k$ are sequentially connected, where k is a quantity of code blocks, and N is a quantity of basic transmission time units.

Step 6 is the same as step 6 in the first type of implementation.

In a specific implementation of the present invention, coding is implemented by performing cross mapping in the CB concatenation phase. To be specific, different transmission versions (for example, $E_{1-1}$, $E_{1-2}$, $E_{1-3}$, and $E_{1-4}$) of a same CB block are dispersedly mapped to the N basic transmission time units, to obtain a time diversity gain. In addition, predecoding can be implemented because one basic transmission time unit includes information about all CBs (k CBs). Corresponding to FIG. 6, decoding can be attempted after a basic transmission time unit, namely, a slot 1, and after a failure, a slot 2 continues to be received and decoding continues to be performed, and so on. If the predecoding succeeds, a feedback may be provided in advance, to avoid subsequent redundant transmission. A data block can be decoded after at least the slot 2 if coding is implemented by performing sequential mapping in the CB concatenation phase. To be specific, corresponding to FIG. 7, different transmission versions (for example, $E_{1-1}$, $E_{1-2}$, $E_{1-3}$, and $E_{1-4}$) of a same CB block are centrally and sequentially mapped to the $M_j$ basic transmission time units.

Type 3: That the sending device performs mapping in the phase in which the modulation symbol is mapped to the time-frequency resource may specifically include the following steps:

Steps 1 to 5 are the same as steps 1 to 5 in the second type of implementation, and Method 2 is used in step 5.

Step 6 includes the following method 1 and method 2.

Method 1: $E_1, E_2, \ldots,$ and $E_k$ are cross-mapped. Bits are read from $E_1, E_2, \ldots,$ and $E_k$ and modulated to obtain $F_1, F_2, \ldots,$ and $F_k$.

$F_1, F_2, \ldots,$ and $F_k$ are mapped to a time-frequency resource. A mapping sequence is: $F_{1,1}, F_{2,1}, \ldots, F_{k,1}, F_{1,2}, F_{2,2}, \ldots F_{k,2}, \ldots, F_{1,N}, F_{2,N}, \ldots,$ and $F_{k,N}$, where k is a quantity of code blocks, and N is a quantity of basic transmission time units. $F_{1,1}, F_{1,2}, \ldots,$ and $F_{1,N}$ are connected in a head-to-tail manner. Specifically, a last modulation symbol in $F_{1,O}$, and a first modulation symbol in $F_{1,O+1}$ are contiguous in $F_1$. To be specific, a last modulation symbol in $F_1$ in an $O^{th}$ basic transmission time unit and a first modulation symbol in $F_1$ in an $(O+1)^{th}$ basic transmission time unit are contiguous in $F_1$.

For example, $F_1=\{1, 2, 3, 4, 5, 6, 7, 8\}$, $F_{1,1}=\{1, 2\}$, $F_{1,2}=\{3, 4\}$, $F_{1,3}=\{5, 6\}$, and $F_{1,4}=\{7, 8\}$. $F_2, \ldots,$ and $F_k$ are also divided by using a same method.

Method 2: $E_1, E_2, \ldots,$ and $E_k$ are sequentially mapped. Specifically, bits are read from $E_1, E_2, \ldots,$ and $E_k$ and modulated to obtain $F_1, F_2, \ldots,$ and $F_k$.

$F_1, F_2, \ldots,$ and $F_k$ are mapped to a time-frequency resource. A mapping sequence is: $F_1, F_2, \ldots,$ and $F_k$.

In a specific implementation of the present invention, coding is implemented by performing cross mapping in the CB concatenation phase. To be specific, different transmission versions (for example, $E_{1-1}, E_{1-2}, E_{1-3},$ and $E_{1-4}$) of a same CB block are dispersedly mapped to the N basic transmission time units, to obtain a time diversity gain. In addition, predecoding can be implemented because one basic transmission time unit includes information about all CBs (k CBs). Corresponding to FIG. 6, decoding can be attempted after a basic transmission time unit, namely, a slot 1, and after a failure, a slot 2 continues to be received and decoding continues to be performed, and so on. If the predecoding succeeds, a feedback may be provided in advance, to avoid subsequent redundant transmission. A data block can be decoded after at least the slot 2 if coding is implemented by performing sequential mapping in the CB concatenation phase. To be specific, corresponding to FIG. 7, different transmission versions (for example, $E_{1-1}, E_{1-2}, E_{1-3},$ and $E_{1-4}$) of a same CB block are centrally and sequentially mapped to the $M_j$ basic transmission time units.

The foregoing specifically describes how the sending device continuously reads some or all the bit sequences in all the elements from S and maps some or all the bit sequences to the transmission resources in the N basic transmission time units in different coding phases in different manners.

It may be understood that a mapping manner in any method embodiment in the foregoing three types of specific implementation methods may also be retained in this application. However, in a specific mapping process, discontinuous reading may be performed, the bit sequences $E_1, E_2, \ldots,$ and $E_k$ are read at a specific location, and mapping is separately performed in the foregoing cross mapping manner and the foregoing sequential mapping manner. This solution still falls within the protection scope of this application. Details are not described herein.

The following method steps may be further included in the embodiments of the present invention.

Optionally, the sending device sends first indication information to the receiving device, where the first indication information is used to indicate a mapping manner in which the sending device maps some or all the bit sequences in all the elements in S to the transmission resources in the N basic transmission time units, and the mapping manner includes the cross mapping and the sequential mapping. To be specific, the sending device indicates, to the receiving device, a specific mapping manner used by the sending device to perform channel coding, so that the receiving device performs corresponding decoding according to the first indication information.

Optionally, the method further includes: when determining that the receiving device fails to receive the TB into which the cyclic redundancy check bit is loaded, obtaining, by the sending device, a bit sequence starting from a specific location in the $S_j$, and mapping the bit sequence to the transmission resources in the $M_j$ basic transmission time units, where the specific location is preset by the sending device or the receiving device, and j=1, 2, ..., and k. To be specific, when the sending device determines that the receiving device fails to receive the TB, it may indicate that a receiving success rate cannot be ensured in a current case in which a current coding mapping manner is used. Therefore, retransmission can be initiated in a prior-art manner in which a bit sequence is read at a specific start location. For example the sending device is a base station, and the receiving device is UE.

In a possible implementation, specific method steps are as follows:

1. The base station sends a first physical downlink control channel (PDCCH) in one scheduling unit to schedule initial transmission of the TB, and sends a second PDCCH in another scheduling unit to schedule retransmission of the TB.
2. The base station selects the $S_j$ from a bit sequence obtained after channel coding, maps the $S_j$ to a time-frequency resource, and sends the $S_j$ to the receiving device. Different redundancy versions RVs are used for the two transmissions, that is, the initial transmission and the retransmission. A quantity of redundancy versions and a start location of each redundancy version in the bit sequence obtained after the channel coding are specified in a protocol.
3. The UE receives indication information, namely, the PDCCHs, sent by the base station, and determines, based on the PDCCHs, that the base station currently uses one PDCCH to schedule the initial transmission and another PDCCH to schedule the retransmission.
4. The UE determines that a method used by the base station to select a coded bit is using different RV versions for a plurality of transmissions. That the quantity of redundancy versions and the start location of each redundancy version in the bit sequence obtained after the channel coding are specified in the protocol is implicitly determined based on a current scheduling mode or determined based on configuration information.

In this embodiment of the present invention, if two RV versions are different, corresponding start locations are also different.

In a possible implementation, specific method steps are as follows:

1. The base station sends a first physical downlink control channel (PDCCH) in one scheduling unit to schedule initial transmission of the TB, and sends a second PDCCH in another scheduling unit to schedule retransmission of the TB.
2. The base station selects the $S_j$ from a bit sequence obtained after channel coding, maps the $S_j$ to a time-frequency resource, and sends the $S_j$ to the receiving device. If the base station side receives a NACK, the base station performs retransmission and continuous reading on a code block starting from a bit that is initially transmitted. If the base station side does not receive a feedback, the base station performs retransmission by using a specific redundancy version RV. A quantity of redundancy versions and a start location of each redundancy version in the bit sequence obtained after the channel coding are specified in a protocol.

3. The UE receives indication information, namely, the PDCCHs, sent by the base station, and determines, based on the PDCCHs, that the base station currently uses one PDCCH to schedule the initial transmission and another PDCCH to schedule the retransmission.

4. The UE determines that a method used by the base station to select a coded bit is using different RV versions for a plurality of transmissions. That the quantity of redundancy versions and the start location of each redundancy version in the bit sequence obtained after the channel coding are specified in the protocol is implicitly determined based on a current scheduling mode or determined based on configuration information.

In this embodiment of the present invention, whether to continuously read a to-be-transmitted bit sequence and map the to-be-transmitted bit sequence to a transmission resource in a basic transmission time unit for transmission is determined based on whether the base station receives a receiving success feedback sent by the UE.

In a possible implementation, specific method steps are as follows:

1. The base station sends a plurality of PDCCHs, to separately schedule a plurality of retransmissions of one TB.
2. The base station selects a coded bit from a bit sequence obtained after channel coding, maps the coded bit to a time-frequency resource, and sends the coded bit to the user equipment. Different RV versions are used for a plurality of transmissions.

A quantity of redundancy versions and a start location of each redundancy version in the bit sequence obtained after the channel coding are specified in a protocol.

3. The UE receives indication information sent by the base station, where the indication information includes the plurality of PDCCHs, to obtain the plurality of retransmissions of the TB.
4. The UE determines that a method used by the base station to select a coded bit is using different RV versions for a plurality of transmissions.

Specifically, the quantity of redundancy versions and the start location of each redundancy version in the coded bit sequence may be implicitly determined based on a current scheduling mode or determined based on configuration information.

Alternatively, the quantity of redundancy versions and the start location of each redundancy version in the coded bit sequence are specified in the protocol.

In a possible implementation, the terminal device may learn, by receiving higher layer signaling or dynamic indication information, whether data is continuously read or read at a specific start location. To be specific, continuous reading or discontinuous reading may be determined by the base station side. Continuous reading is used in some cases, and discontinuous reading is used in some scenarios.

In a possible implementation, a start location for reading data is determined based on a transmission case. In a case in which scheduling is performed through slot aggregation by using one PDCCH, continuous reading is used. In a case in which slot scheduling is performed by using one PDCCH, reading at a specific location is used.

In this embodiment of the present invention, different coding schemes may be used for coding in different transmission manners, to ensure coding performance and ensure a receiving success rate after the coding.

Figure 8:
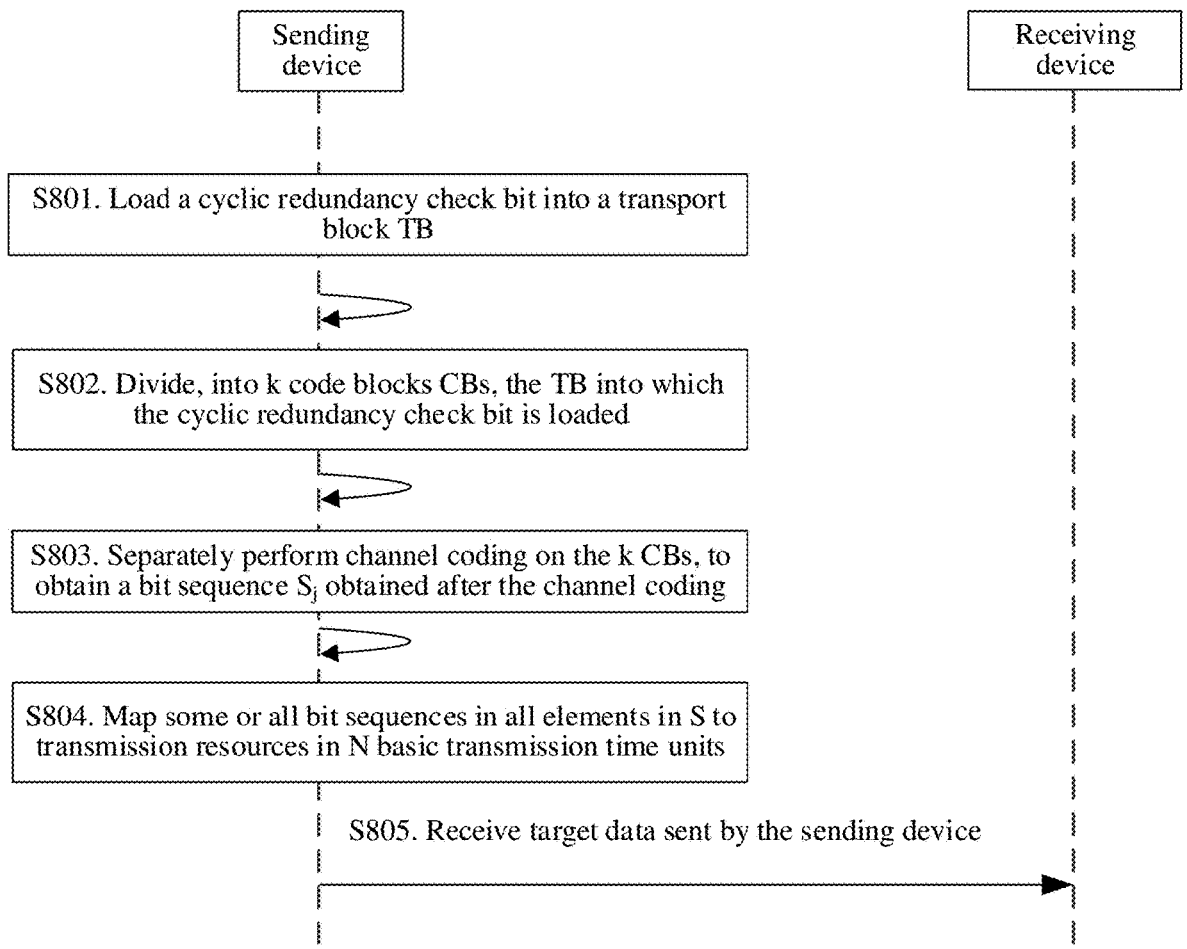
FIG. 8 is a schematic flowchart of another data receiving method according to an embodiment of the present invention.

FIG. 8 is a schematic flowchart of another data receiving method according to an embodiment of the present invention. The method may be applied to the communications system in FIG. 2. Descriptions are provided below from a perspective of interaction between a sending device and a receiving device with reference to FIG. 8. The method may include step S801 to step S805.

S801. The sending device loads a cyclic redundancy check bit into a transport block TB.

S802. The sending device divides, into k code blocks CBs, the TB into which the cyclic redundancy check bit is loaded, where k is an integer greater than or equal to 1.

S803. The sending device separately performs channel coding on the k CBs, to obtain a bit sequence $S_j$ obtained after the channel coding, where j=1, 2, . . . , and k, and a set $S=\{S_1, S_2, \ldots, S_k\}$.

S804. The sending device maps some or all bit sequences in all elements in S to transmission resources in N basic transmission time units.

Specifically, for step S801 to step S804, refer to the descriptions of step S401 to step S404 in the embodiment corresponding to FIG. 5. Details are not described herein again.

S805. The receiving device receives target data sent by the sending device.

Specifically, the target data is sent by the sending device by mapping some or all the bit sequences in all the elements in the set $S=\{S_1, S_2, \ldots, S_k\}$ to the transmission resources in the N basic transmission time units. The element in S is the bit sequence $S_j$ obtained after the channel coding is separately performed on the k code blocks CBs obtained from the transport block TB into which the cyclic redundancy check bit is loaded, where j=1, 2, . . . , and k, k is an integer greater than or equal to 1, and N is an integer greater than 1. Some or all bit sequences in the $S_j$ are mapped to transmission resources in $M_j$ basic transmission time units, and the $M_j$ basic transmission time units are a subset or a universal set of the N basic transmission time units, where j=1, 2, . . . , and k, and $M_j$ is an integer greater than 1 and less than or equal to N. A last bit in the $S_j$ mapped to an $m^{th}$ basic transmission time unit in the $M_j$ basic transmission time units and a first bit in the $S_j$ mapped to an $(m+1)^{th}$ basic transmission time unit are contiguous in the $S_j$, where m is an integer greater than or equal to 1, and m+1 is less than or equal to $M_j$.

After receiving the target data sent by the sending device, the receiving device decodes the target data according to a related decoding rule predefined in a protocol.

Further, the receiving device receives first indication information sent by the sending device. The first indication information is used to indicate a mapping manner in which the sending device maps some or all the bit sequences in all the elements in S to the transmission resources in the N basic transmission time units. The mapping manner includes cross mapping and sequential mapping. The cross mapping is that some or all bit sequences in different Sjs are cross-mapped to transmission resources in a plurality of basic transmission time units, and the sequential mapping is that some or all bit sequences in a same $S_j$ are continuously mapped to transmission resources in a plurality of basic transmission time units. For details, refer to the related descriptions in the embodiment corresponding to FIG. 5. The details are not described herein again.

The foregoing describes in detail the method in the embodiments of the present invention, and the following provides a related apparatus in the embodiments of the present invention.

Figure 9:
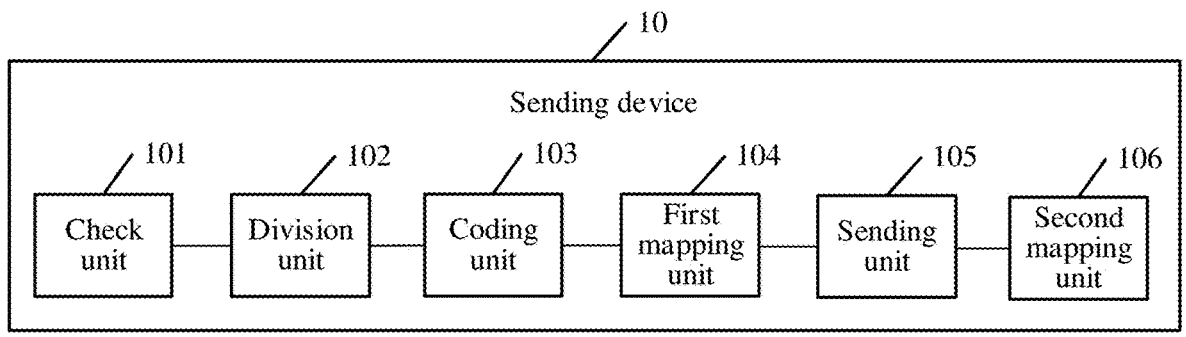
FIG. 9 is a schematic structural diagram of a sending device according to an embodiment of the present invention.

FIG. 9 is a schematic structural diagram of a sending device according to an embodiment of the present invention. The sending device 10 may include a check unit 101, a division unit 102, a coding unit 103, and a first mapping unit 104. Optionally, the sending device 10 may further include a sending unit 105 and a second mapping unit 1o6. Each unit is described in detail as follows:

The check unit 101 is configured to load a cyclic redundancy check bit into a transport block TB.

The division unit 102 is configured to divide, into k code blocks CBs, the TB into which the cyclic redundancy check bit is loaded, where k is an integer greater than or equal to 1.

The coding unit 103 is configured to separately perform channel coding on the k CBs, to obtain a bit sequence $S_j$ obtained after the channel coding, where j=1, 2, . . . , and k, and a set S={S1, S2, . . . , Sk}.

The first mapping unit 104 is configured to map some or all bit sequences in all elements in S to transmission resources in N basic transmission time units, where N is an integer greater than 1, some or all bit sequences in the $S_j$ are mapped to transmission resources in $M_j$ basic transmission time units. The $M_j$ basic transmission time units are a subset or a universal set of the N basic transmission time units, j=1, 2, . . . , and k, and $M_j$ is an integer greater than 1 and less than or equal to N. A last bit in the $S_j$ mapped to an $m^{th}$ basic transmission time unit in the $M_j$ basic transmission time units, and a first bit in the $S_j$ mapped to an $(m+1)^{th}$ basic transmission time unit are contiguous in the $S_j$, m is an integer greater than or equal to 1, and m+1 is less than or equal to $M_j$.

Optionally, the first mapping unit 104 is specifically configured to: cross-map some or all the bit sequences in all the elements in S to the transmission resources in the N basic transmission time units, where the cross mapping is that some or all bit sequences in different Sjs are cross-mapped to transmission resources in a plurality of basic transmission time units; or sequentially map some or all the bit sequences in all the elements in S to the transmission resources in the N basic transmission time units, where the sequential mapping is that some or all bit sequences in a same $S_j$ are continuously mapped to transmission resources in a plurality of basic transmission time units.

Optionally, the sending device 101 further includes that the sending unit 105 is configured to send first indication information to the receiving device, where the first indication information is used to indicate a mapping manner in which the sending device maps some or all the bit sequences in all the elements in S to the transmission resources in the N basic transmission time units, and the mapping manner includes the cross mapping and the sequential mapping.

Optionally, the basic transmission time unit includes any one of a subframe, a slot, and a mini-slot.

Optionally, the $S_j$ is a bit sequence obtained after low-density parity-check LDPC coding, where j=1, 2, . . . , and k.

Optionally, the sending device 10 further includes that the second mapping unit 106 is configured to: when it is determined that the receiving device fails to receive the TB into which the cyclic redundancy check bit is loaded, obtain a bit sequence starting from a specific location in the $S_j$, and map the bit sequence to the transmission resources in the $M_j$ basic transmission time units, where the specific location is preset by the sending device or the receiving device, where j=1, 2, . . . , and k.

It should be noted that for functions of function units in the sending device 10 described in this embodiment of the present invention, reference may be made to related descriptions in the foregoing method embodiments in FIG. 1 to FIG. 8. Details are not described herein again.

Figure 10:
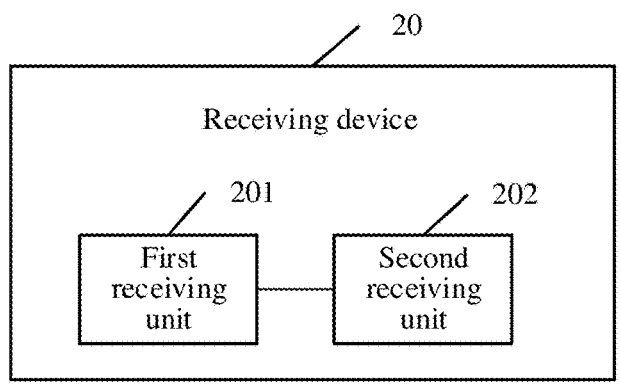
FIG. 10 is a schematic structural diagram of a receiving device according to an embodiment of the present invention.

FIG. 10 is a schematic structural diagram of a receiving device according to an embodiment of the present invention. The receiving device 20 may include a first receiving unit 101. Optionally, the receiving device 20 may further include a second receiving unit 102. Each unit is described in detail as follows:

The first receiving unit 101 is configured to receive target data sent by a sending device, where the target data is sent by the sending device by mapping some or all bit sequences in all elements in a set S={$S_1$, $S_2$, . . . , $S_k$} to transmission resources in N basic transmission time units. The element in S is a bit sequence $S_j$ obtained after channel coding is separately performed on k code blocks CBs obtained from a transport block TB into which a cyclic redundancy check bit is loaded, j=1, 2, . . . , and k, k is an integer greater than or equal to 1, and N is an integer greater than 1. Some or all bit sequences in the $S_j$ are mapped to transmission resources in $M_j$ basic transmission time units. The $M_j$ basic transmission time units are a subset or a universal set of the N basic transmission time units, j=1, 2, . . . , and k, and $M_j$ is an integer greater than 1 and less than or equal to N, and a last bit in the $S_j$ mapped to an $m^{th}$ basic transmission time unit in the $M_j$ basic transmission time units and a first bit in the $S_j$ mapped to an $(m+1)^{th}$ basic transmission time unit are contiguous in the $S_j$, m is an integer greater than or equal to 1, and m+1 is less than or equal to $M_j$.

Optionally, the target data is sent by the sending device by cross-mapping some or all the bit sequences in all the elements in S to the transmission resources in the N basic transmission time units, and the sequential mapping is that some or all bit sequences in different Sjs are cross-mapped to transmission resources in a plurality of basic transmission time units.

Alternatively, the target data is sent by the sending device by sequentially mapping some or all the bit sequences in all the elements in S to the transmission resources in the N basic transmission time units, and the sequential mapping is that some or all bit sequences in a same $S_j$ are continuously mapped to transmission resources in a plurality of basic transmission time units.

Optionally, the receiving device 20 further includes:

The second receiving unit 102 is configured to receive first indication information sent by the sending device, where the first indication information is used to indicate a mapping manner in which the sending device maps some or all the bit sequences in all the elements in S to the transmission resources in the N basic transmission time units, the mapping manner includes the cross mapping and the sequential mapping, the cross mapping is that some or all bit sequences in different Sjs are cross-mapped to transmission resources in a plurality of basic transmission time units, and the sequential mapping is that some or all bit sequences in a same $S_j$ are continuously mapped to transmission resources in a plurality of basic transmission time units.

It should be noted that for functions of function units in the receiving device 20 described in this embodiment of the present invention, reference may be made to related descriptions in the foregoing method embodiments in FIG. 1 to FIG. 8. Details are not described herein again.

Figure 11:
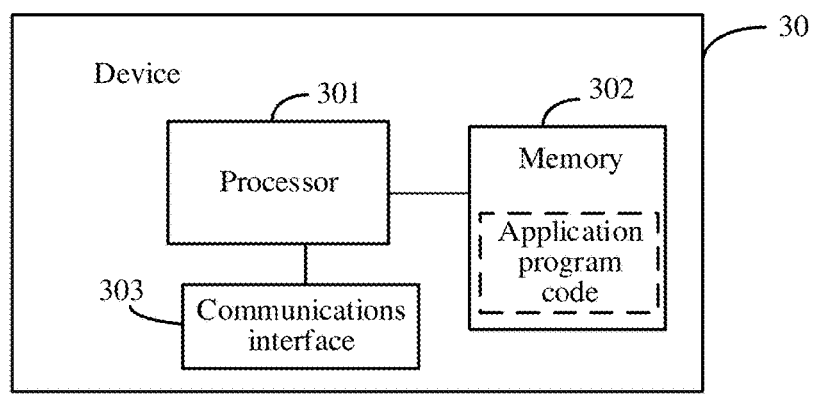
FIG. 11 is a schematic structural diagram of a device according to an embodiment of the present invention.

FIG. 11 is a schematic structural diagram of a device according to an embodiment of the present invention. Both the sending device 10 and the receiving device 20 may be implemented in a structure in FIG. 11. The device 30 includes at least one processor 301, at least one memory 302, and at least one communications interface 303. In addition, the device may further include a general-purpose component such as an antenna. Details are not described herein.

The processor 301 may be a general-purpose central processing unit (CPU), a microprocessor, an application-specific integrated circuit (ASIC), or one or more integrated circuits configured to control program execution of the foregoing solution.

The communications interface 303 is configured to communicate with another device or a communications network, such as the Ethernet, a radio access network (RAN), or a wireless local area network (WLAN).

The memory 302 may be a read-only memory (ROM) or another type of static storage device that can store static information and instructions, or a random access memory (RAM) or another type of dynamic storage device that can store information and instructions. Alternatively, the memory 302 may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store desired program code in a form of an instruction or a data structure and that can be accessed by a computer. However, the memory 302 is not limited thereto. The memory may exist independently and is connected to the processor by using a bus. Alternatively, the memory may be integrated into the processor.

The memory 302 is configured to store application program code for executing the foregoing solution, and the processor 301 controls the execution. The processor 301 is configured to execute the application program code stored in the memory 1202.

When the device shown in FIG. 11 is the sending device 10, the code stored in the memory 302 may be used to perform the foregoing provided information sending method, for example, load a cyclic redundancy check bit into a transport block TB; divide, into k code blocks CBs, the TB into which the cyclic redundancy check bit is loaded, where k is an integer greater than or equal to 1; separately perform channel coding on the k CBs, to obtain a bit sequence $S_j$ obtained after the channel coding, where j=1, 2, . . . , and k, and a set $S=\{S_1, S_2, \ldots, S_k\}$; and map some or all bit sequences in all elements in S to transmission resources in N basic transmission time units, where N is an integer greater than 1; some or all bit sequences in the $S_j$ are mapped to transmission resources in $M_j$ basic transmission time units; the $M_j$ basic transmission time units are a subset or a universal set of the N basic transmission time units, j=1, 2, . . . , and k, and $M_j$ is an integer greater than 1 and less than or equal to N; and a last bit in the $S_j$ mapped to an $m^{th}$ basic transmission time unit in the $M_j$ basic transmission time units and a first bit in the $S_j$ mapped to an $(m+1)^{th}$ basic transmission time unit are contiguous in the $S_j$, m is an integer greater than or equal to 1, and m+1 is less than or equal to $M_j$.

When the device shown in FIG. 11 is the receiving device 20, the code stored in the memory 302 may be used to perform the foregoing provided visible light-based communication method performed by a coordinator, for example, receive target data sent by a sending device, where the target data is sent by the sending device by mapping some or all bit sequences in all elements in a set $S=\{S_1, S_2, \ldots, S_k\}$ to transmission resources in N basic transmission time units; the element in S is a bit sequence $S_j$ obtained after channel coding is separately performed on k code blocks CBs obtained from a transport block TB into which a cyclic redundancy check bit is loaded, j=1, 2, . . . , and k, k is an integer greater than or equal to 1, and N is an integer greater than 1; some or all bit sequences in the $S_j$ are mapped to transmission resources in $M_j$ basic transmission time units; the $M_j$ basic transmission time units are a subset or a universal set of the N basic transmission time units, j=1, 2, . . . , and k, and $M_j$ is an integer greater than 1 and less than or equal to N; and a last bit in the $S_j$ mapped to an $m^{th}$ basic transmission time unit in the $M_j$ basic transmission time units and a first bit in the $S_j$ mapped to an $(m+1)^{th}$ basic transmission time unit are contiguous in the $S_j$, m is an integer greater than or equal to 1, and m+1 is less than or equal to $M_j$.

It should be noted that for functions of function units in each of the sending device 10 and the receiving device 20 that are described in the embodiments of the present invention, reference may be made to related descriptions in the foregoing method embodiments in FIG. 1 to FIG. 8. Details are not described herein again.

An embodiment of the present invention further provides a computer storage medium. The computer storage medium may store a program, and when the program is executed, some or all of the steps of either of the channel coding method and the data receiving method that are recorded in the foregoing method embodiments are performed.

An embodiment of the present invention further provides a computer program. The computer program includes an instruction, and when the computer program is executed by a computer, the computer may be enabled to perform some or all of the steps of either of the channel coding method and the data receiving method.

In the foregoing embodiments, the descriptions of the embodiments have respective focuses. For a part that is not described in detail in an embodiment, refer to related descriptions in another embodiment.

It should be noted that for brief description, the foregoing method embodiments are represented as a series of actions. However, persons skilled in the art should appreciate that this application is not limited to the described order of the actions, because according to this application, some steps may be performed in another order or simultaneously. In addition, persons skilled in the art should also appreciate that all the embodiments described in the specification are preferred embodiments, and the provided actions and modules are not necessarily mandatory to this application.

In the several embodiments provided in this application, it should be understood that the disclosed apparatus may be implemented in another manner. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer readable storage medium. Based on such an understanding, the technical solutions of this application essentially, or the part contributing to the current system, or all or some of the technical solutions may be implemented in a form of a software product. The computer software product is stored in a storage medium, and includes several instructions for instructing a computer device (which may be a personal computer, a server, a network device, or the like, and may be specifically a processor in the computer device) to perform all or some of the steps of the foregoing methods in the embodiments of this application. The foregoing storage medium may include any medium that can store program code, for example, a USB flash drive, removable hard disk, a magnetic disk, an optical disc, a read-only memory (ROM), or a random access memory (RAM).

In conclusion, the foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of this application.

The invention claimed is:

1. A method, comprising:
sending, by a device, second indication information indicating redundancy versions for at least N transmissions of a transport block (TB), wherein a time unit of each transmission of the at least N transmissions is a basic transmission time unit of N basic transmission time units, wherein the redundancy versions for the at least N transmissions are different, and wherein N is an integer greater than 1;
including, by the device, a cyclic redundancy check bit into the TB;
dividing, by the device, the TB into k code blocks (CBs), wherein k is an integer greater than or equal to 1;
separately performing, by the device, channel coding on the k CBs to obtain one or more bit sequences $S_j$, wherein j is a numeric sequence of integers from 1 to k, where $S_j$ belongs to a set S, $S=\{S_1, S_2 \ldots S_k\}$; and
mapping, by the device, all or part of the one or more bit sequences $S_j$ to transmission resources of a subset, or a universal set, of the N basic transmission time units, wherein a start position in the transmission resources of the N basic transmission time units for the one or more bit sequences $S_j$ is determined based on redundancy versions for the at least N transmissions of the TB;
wherein the at least N transmissions are scheduled by at least two physical downlink control channels (PDCCHs).

2. The method according to claim 1, wherein the at least N transmissions of the TB are repetition transmissions for the TB.

3. The method according to claim 1, wherein scheduling modes of the at least N transmission are determined by configuration information.

4. The method according to claim 1, wherein a number of the redundancy versions and start positions of the one or more bit sequences $S_j$, after channel coding corresponding to different redundancy versions, are predefined.

5. The method according to claim 1, wherein
sequentially mapping all or part of a bit sequence in the one or more bit sequences $S_j$ comprises continuously mapping all or part of bit sequences in $S_j$ to transmission resources in the N basic transmission time units.

6. A method, comprising:
receiving, by a device, second indication information indicating redundancy versions for at least N transmissions of a transport block (TB), wherein a time unit of each transmission of the at least N transmissions is a basic transmission time unit of N basic transmission time units, wherein the redundancy versions for the at least N transmissions are different, and wherein N is an integer greater than 1; and
receiving, by the device, target data from a sending device, wherein the target data is obtained by mapping all or part of one or more bit sequences $S_j$ to transmission resources of the N basic transmission time units, wherein j is a numeric sequence of integers from 1 to k, wherein where $S_j$ belongs to a set S, $S=\{S_1, S_2 \ldots S_k\}$, wherein a bit sequence of the one or more bit sequences $S_j$ is a bit sequence obtained after dividing the TB into k code blocks (CBs) and performing channel coding on one code block of the k CBs, wherein the TB includes a cyclic redundancy check bit, wherein all or part of the one or more bit sequences $S_j$ is mapped to transmission resources of a subset or a universal set of the N basic transmission time units, and wherein a start position in the transmission resources of the N basic transmission time units for the one or more bit sequences $S_j$ is determined based on redundancy versions for the at least N transmissions of the TB;
wherein the at least N transmissions are scheduled by at least two physical downlink control channels (PDCCHs).

7. The method according to claim 6, wherein the at least N transmissions of the TB are repetition transmissions for the TB.

8. The method according to claim 6, wherein scheduling modes of the at least N transmission are determined by configuration information.

9. The method according to claim 6, wherein a number of the redundancy versions and start positions of the one or more bit sequences $S_j$, after channel coding corresponding to different redundancy versions, are predefined.

10. A device, comprising:
a processor; and
a non-transitory computer-readable storage medium storing a program to be executed by the processor, the program including instructions for:
sending, by a device, second indication information indicating redundancy versions for at least N transmissions of a transport block (TB), wherein a time unit of each transmission of the at least N transmissions is a basic transmission time unit of N basic transmission time units, wherein the redundancy versions for the at least N transmissions are different, and wherein N is an integer greater than 1;

including, by the device, a cyclic redundancy check bit into the TB;

dividing, by the device, the TB into k code blocks (CBs), wherein k is an integer greater than or equal to 1;

separately performing, by the device, channel coding on the k CBs to obtain one or more bit sequences $S_j$, wherein j is a numeric sequence of integers from 1 to k, where $S_j$ belongs to a set S, S={$S_1, S_2 \ldots S_k$}; and mapping, by the device, all or part of the one or more bit sequences $S_j$ to transmission resources of a subset, or a universal set, of the N basic transmission time units, wherein a start position in the transmission resources of the N basic transmission time units for the one or more bit sequences $S_j$ is determined based on redundancy versions for the at least N transmissions of the TB;

wherein the at least N transmissions are scheduled by at least two physical downlink control channels (PDCCHs).

11. The device according to claim 10, wherein the at least N transmissions of the TB are repetition transmissions for the TB.

12. The device according to claim 10, wherein scheduling modes of the at least N transmission are determined by configuration information.

13. The device according to claim 10, wherein a number of the redundancy versions and start positions of the one or more bit sequences $S_j$, after channel coding corresponding to different redundancy versions are, predefined.

14. The device according to claim 10, wherein sequentially mapping all or part of a bit sequence in the one or more bit sequences $S_j$ comprises continuously mapping all or part of bit sequences in $S_j$ to transmission resources in the N basic transmission time units.

15. A device, comprising:
a processor; and
a non-transitory computer-readable storage medium storing a program to be executed by the processor, the program including instructions for:

receiving, by a device, second indication information indicating redundancy versions for at least N transmissions of a transport block (TB), wherein a time unit of each transmission of the at least N transmissions is a basic transmission time unit of N basic transmission time units, wherein the redundancy versions for the at least N transmissions are different, and wherein N is an integer greater than 1; and receiving, by the device, target data from a sending device, wherein the target data is obtained by mapping all or part of one or more bit sequences $S_j$ to transmission resources of the N basic transmission time units, wherein j is a numeric sequence of integers from 1 to k, wherein where $S_j$ belongs to a set S, S={$S_1, S_2 \ldots S_k$}, wherein a bit sequence of the one or more bit sequences $S_j$ is a bit sequence obtained after dividing the TB into k code blocks (CBs) and performing channel coding on one code block of the k CBs, wherein the TB includes a cyclic redundancy check bit, wherein all or part of the one or more bit sequences $S_j$ is mapped to transmission resources of a subset or a universal set of the N basic transmission time units, and wherein a start position in the transmission resources of the N basic transmission time units for the one or more bit sequences $S_j$ is determined based on redundancy versions for the at least N transmissions of the TB;

wherein the at least N transmissions are scheduled by at least two physical downlink control channels (PDCCHs).

16. The device according to claim 15, wherein the at least N transmissions of the TB are repetition transmissions for the TB.

17. The device according to claim 15, wherein scheduling modes of the at least N transmission are determined by configuration information.

18. The device according to claim 15, wherein a number of the redundancy versions and start positions of the one or more bit sequences $S_j$, after channel coding corresponding to different redundancy versions, are predefined.

* * * * *